United States Patent
Berger et al.

(10) Patent No.: US 6,563,100 B1
(45) Date of Patent: May 13, 2003

(54) METHOD OF PROCESSING MEASUREMENT DATA HAVING ERRORS DUE TO UNPREDICTABLE NON-UNIFORMITY IN ILLUMINATION OF DETECTORS

(75) Inventors: Henry Berger, Alexandria, VA (US); Edward Howard Bosch, Woodbridge, VA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 09/208,444

(22) Filed: Dec. 10, 1998

(51) Int. Cl.$^7$ ............................................... H01L 27/00
(52) U.S. Cl. .................................... 250/208.1; 382/255
(58) Field of Search .......................... 250/208.1, 214 R, 250/214 C, 214 B, 214.1; 382/254, 255, 274, 275; 348/234–238

(56) References Cited

U.S. PATENT DOCUMENTS

| | | | | |
|---|---|---|---|---|
| 3,644,014 A | * | 2/1972 | Hirschberg | .................. 359/24 |
| 4,345,148 A | | 8/1982 | Pines et al. | .................. 250/214 |
| 4,785,169 A | * | 11/1988 | Gontin | ........................ 250/340 |
| 5,075,833 A | | 12/1991 | Dormand | .................... 362/376 |
| 5,259,568 A | | 11/1993 | Amon et al. | ............... 244/3.13 |

OTHER PUBLICATIONS

Dereniak, E. L and G. D. Boreman "Infrared Detectors andSystems" John Wiley, NY 1996, pp. 152–153.
Holst, G. C., "Electro–Optical Imaging System Performande" SPIE Opt. Eng. Press 2000, pp. 6,201 and 203.
Kaufman, Y. J., "The atmospheric effect on remote sensing and its Correction" Chap, 9 of "Theory and Applications of Optical Remote Sensing," G. Asrar, Ed., John Wiley, NY 1989, pp. 336–337 McKenna, Charles M. Personal communication May 1997.
Miller, J. L and E. Friedman "Photonics Rules of Thumg: Optics, Electro–Optics, Fiber Optics, and Lasers" McGraw–Hill, NY 1996, p 269.
Nicodemus, F. E., J. C. Richmond et al., "Geometrical considerations and nomenclature in reflectance," National Bureau of Standards, U.S. Dept. Commerce 1997, p. 37.
Nussbaum, A. and R. A. Phillips "Contemporary Optics for Scientists and Engineers" Prentice–Hall, Englewood Cliffs, NJ Chap. 10, 1976, p. 273.
Schulz, M and L. Caldwell "Nonuniformity corrections and correctability of infrared focal plane arrays," Infrared Phys. & Tech., 36, 1995, pp 763–777.
Stover, J. C., "Optical Scattering: Measurement and Analysis," $2^{nd}$ ed., SPIE Opt. Eng. Press, 1995, pp. 12–19.

* cited by examiner

Primary Examiner—Que T. Le
Assistant Examiner—Thanh X. Luu
(74) Attorney, Agent, or Firm—Earl H. Baugher, Jr.

(57) ABSTRACT

A method for reducing error (when compared to conventional methods) in estimates of radiance inferred from measurements of irradiance provided by detectors in an array of a sensor. By using measurement data from each cluster in a set of nested clusters in the neighborhood of a selected detector and applying selected mathematical relationships, an accurate estimate is obtained. A source of this error springs from the non-uniformity of illumination that occurs within the finite solid angle field of view (FOV) of a detector in a sensor array due, at least in part, to intrinsic unpredictable characteristics of the scene being viewed by the sensor array. To achieve fine resolution with reasonably sized detector FOVs, this non-uniformity makes impractical the use of average values of illumination within the solid angle defining the detector's FOV, the conventional method for deriving estimates of radiance.

2 Claims, 5 Drawing Sheets

METHOD OF PROCESSING MEASUREMENT DATA HAVING ERRORS DUE TO UNPREDICTABLE NON-UNIFORMITY IN ILLUMINATION OF DETECTORS

STATEMENT OF GOVERNMENT INTEREST

The invention described herein may be manufactured and used by or for the Government of the United States of America for governmental purposes without the payment of any royalties thereon or therefor.

FIELD OF THE INVENTION

The present invention relates generally to detectors, and in particular to the enhancement of a display by refining an approximation of the actual energy received at a detector.

BACKGROUND

The measurement of radiance underlies many operations in remote sensing such as determining spectral signature (e.g., via measuring spectral directional reflectance factor, R) and sensing spatial imagery. Since optical detectors measure irradiance, the radiance is inferred and not directly measured. As a result there is a problem in the processing of irradiance measurement data in order to determine radiance that does not appear to be directly addressed in the literature. These errors intrinsic to the scene being viewed are produced by the unpredictable non-uniform illumination of the instantaneous-field-of-view (IFOV) of the individual optical detectors in an array of such detectors comprising a sensor.

These considerations are applicable to both passive and active sensors and to sensing via reflected and/or emitted radiance. They are also applicable to almost all detectors in the visible, infrared and ultraviolet bands that are designed to respond to the total incident optical power in whatever wavelength or bandwidths they are sensitive. Further background is provided in the following references:

Dereniak, E. L. and G. D. Boreman, "Infrared Detectors and Systems," John Wiley, NY, 1996, pp. 152–3.
Hoist, G. C., "Electro-Optical Imaging System Performance," SPIE Opt. Eng. Press, 2000, pp. 6,201, and 203.
Kaufman, Y. J., "The atmospheric effect on remote sensing and its correction," Chap. 9 of "Theory and Applications of Optical Remote Sensing," G. Asrar, Ed., John Wiley, NY, 1989, pp. 336–7.
McKenna, Charles M., Personal communication, May 1997.
Miller, J. L. and E. Friedman, "Photonics Rules of Thumb: Optics, Electro-Optics, Fiber Optics, and Lasers," McGraw-Hill, NY, 1996, p. 269.
Nicodemus, F. E., J. C. Richmond, et al., "Geometrical considerations and nomenclature in reflectance," National Bureau of Standards, U.S. Dept. Commerce, 1977, p. 37.
Nussbaum, A. and R. A. Phillips, "Contemporary Optics for Scientists and Engineers," Prentice-Hall, Englewood Cliffs, N.J., Chap. 10, 1976, p. 273.
Schulz, M. and L. Caldwell, "Nonuniformity correction and correctability of infrared focal plane arrays," Infrared Phys. & Tech., 36, 1995, pp. 763–777.
Stover, J. C., "Optical Scattering: Measurement and Analysis," 2nd ed., SPIE Opt. Eng. Press, 1995, pp. 12–19.

During operation, individual detectors record the total irradiance E in some spectral band illuminating the non-infinitesimal solid angle subtended by each of the detectors. This is normally used to calculate an average radiance ($L_{av}$) based on the presumption of a uniform illumination of that solid angle. Usually the pattern of illumination is in fact non-uniform. This non-uniformity is not, and probably cannot, in principle, be calibrated out by any in-lab, pre- or post-operational usage procedure. The reasons for this are that the non-uniformities: vary unpredictably with the specific portion of the particular scene being viewed, vary in an unpredictable way from detector to detector in the array since they are usually arranged to view different portions of the scene, and vary unpredictably from instant to instant for time-varying scenes and for arrays in relative motion with respect to the scenes being viewed.

The non-uniformity in illumination of the Instantaneous Field of View (IFOV) of a single detector can be due to relatively fine surface features, relatively small objects, changes in reflectance or emittance due to relatively abrupt changes in topography or ground or object composition, and relatively abrupt changes in surface altitude within the IFOV of a single detector. The IFOV is a function of individual detector geometry and other characteristics. This value is related to the projected solid angle of a detector indicative of the portion of a scene that the detector is capable of viewing at any one time. Both the IFOV and the projected solid angle are essentially dictated by the design of the sensor and need no further elaboration for their respective derivations.

Despite the variation in illumination within any one solid angle subtended by an optical detector, the single measured irradiance, E, from one detector produces a single output, i.e., a pixel in an image (for an imaging sensor) that has a single magnitude of brightness corresponding to $L_{av}$ in the detector's spectral band. This pixel covers a small, but non-infinitesimal, area of the image.

An image typically consists of an orderly array of a very large number of pixels that, when viewed as a whole, display the image. Irradiance (E) and radiance (L) are fundamentally related through the mathematical derivative relation $$L = \frac{dE}{d\Sigma} \tag{1}$$

(where $\Sigma$=projected solid angle) and its inverse (integral) relation $$E = \int L \, d\Sigma \tag{2}$$

This effectively leads to characterizing the illuminated detectors as averaging the unpredictable non-uniform radiance received over the various lines-of-sight within their IFOV. Only when the illumination of the detector's IFOV is uniform or nearly so, is there little or no error from using a radiance/irradiance geometric relation specific to the detector geometry, to determine the radiance from the detector response.

In terms of average radiance incident on the $i^{th}$ detector, $L_{av_i}$, (averaged over the projected solid-angle $\Sigma_i$ of the IFOV of the $i^{th}$ detector)

$$L_{av_i} = \frac{\int \theta L_i(\theta, \Omega) d\Sigma_i}{\int d\Sigma_i} \tag{3}$$

(where $\theta$=zenith angle and $\Omega$=azimuth angle and $d\Sigma_i$=cos $\theta_i$ $d\theta_i \, d\Omega_i$) the irradiance illuminating the $i^{th}$ detector can be expressed as $$E_i = \Sigma_i (L_{av_i}). \tag{4}$$

Clearly, when $L_i(\theta,\Omega)$=constant, then $L_i$ can be inferred from $$L_i = \frac{E_i}{\Sigma_i} \tag{5}$$

However, when the unpredictable illumination of the IFOV is strongly non-uniform and the detector response still is related to the average radiance value, the user must consider what relationship that average radiance value has to his desired measure. Such a desired measure might be the peak radiance within the IFOV or the radiance along the line-of-sight through the geometric center of the IFOV or some other measure. The choice of measure will generally depend to what purpose the data will be applied. The difference between the desired and inferred measures is termed the error. Such errors contribute to image distortion.

Presently known procedures typically correct for extrinsic sources of non-uniform illumination fields for which exist some physical models to guide the correction. These extrinsic sources usually are contributed from one or more of the following mechanisms: platform motion; media lying between surface viewed (or ground) and platform (e.g., turbulence); and sensor optics and/or detectors.

In dealing with such causes of non-uniform illumination of individual detectors in an array, the physics of the phenomenon is invoked in a model to reduce the effect of non-uniform illumination. Assume that the non-uniformity of illumination is intrinsic to the scene viewed. Thus, a physical model of an intrinsic process cannot be invoked. A reference that provides a broad catalogue of error sources and effects is Holst, ibid.

A non-uniformity intrinsic to the viewed scene is similar to the spatial photoresponse non-uniformity of detector arrays in which the photoresponsivity of the individual detectors in the array have manufacturing differences to include unequal "aging" rates of component materials. That is referred to as pattern noise, contributed by variations among detectors. The error source addressed by a preferred embodiment of the present invention involves unpredictable spatial variations of illumination occurring within the IFOV of each detector that may also vary unpredictably with time.

There are many sources of errors and imagery distortions for remotely sensed imagery, both endogenous and exogenous. External sources of image errors and distortions are usually dominated by those due to the presence of the atmosphere and these are very much dependent on the state of the atmosphere through which the optical energy propagates as well as the wavelength bands being used.

The optical system between the array of detectors and the atmosphere also contributes significantly to the degradation of the image to be sensed by that array. The reduction of the number of ranges of spatial frequencies is conveniently characterized by the optical transfer function of this optical system. Care must be taken with this representation when it is extended to include the detectors because of their non-linear characteristics.

There are a number of different classes of detectors, each of which has its detection performance hindered by a variety of noise mechanisms. Of all of these mechanisms, there is one that bears some very slight similarity with the unpredictable non-uniform illumination of the IFOV problem. It is the spatial photoresponse non-uniformity of the detector array itself that can cause a severe problem in the use of infrared focal plane arrays. It is referred to as a fixed pattern noise and is created by the unintended differences in photoresponsivity of the individual detectors in the array.

In a preferred embodiment of the present invention no errors due to the nature of processing are addressed. For example, there are errors from the digitizing of the received analog signal resulting in some lower bound on radiometric resolution. Certainly a suitably sized aperture can create a non-uniform distortion of an image, but that is a fixed structure associated with the imaging equipment.

Furthermore, normally each detector is being illuminated, at least in part, by some different portion of the overall scene being viewed by the array of detectors comprising the sensor. For a detector array in relative motion with respect to the scenes being observed, as usually occurs in remote sensing, the non-uniformity in illumination of the individual IFOVs continue to vary in time throughout a mission.

It is not just the unpredictable non-uniformity of the illumination of the IFOV that is the problem but also it's the character of the illumination that can generate errors. For example, in the case of a variation in only one dimension, the illumination (i.e., the magnitude of the radiance) varies linearly with angle across the IFOV of a detector bounded by angles $\theta_i$ and $\theta_j$, thus $$L_i(\theta) = a_i\theta_i + b_i, \theta_i \leq \theta \leq \theta_j \tag{6}$$

where $a_i$ and $b_i$ are constants. Then, assuming $\theta \sim 0$ so that $\cos\theta \sim 1$ as is often the case.

$$E_i = \int \theta L_i(\theta)d\theta = \left(\frac{a_i}{2}\right)[\theta_i^2 - \theta_j^2] + (b_i)[\theta_i - \theta_j] \tag{7}$$

Dividing Eqn. (7) by $[\theta_i - \theta_j]$ produces the average value of $L_i(\theta)$ in the range of $\theta$ located at the midpoint between $\theta_i - \theta_j$, $$\frac{E_i}{[\theta_i - \theta_j]} = \frac{(a_i)[\theta_i - \theta_j]}{2} + (b_i) = L_{av_i} \tag{8}$$

Thus if in the application of interest all that is required is that the measured value produces the average value of radiance at the center of the pixel, no distortion or error is produced. However, this is seldom the case for "real-world" measurements.

Accordingly, a method is needed for determining approximate peak and valley radiance values in symmetric cases from measurement data as well as approximate values at the detector geometric surface centers for non-monotonically increasing and decreasing segments of the radiance fields. The method is also needed to deal with the effects of unpredictable, non-uniform illumination of detectors caused by any number of different environmental conditions or characteristics of the scene being viewed by the detectors.

SUMMARY

Accordingly, it is an object of the present invention to improve numerical accuracy of quantitative imaging.

It is another object of the present invention to increase image contrast.

It is a further object of the present invention to decrease spatial blurring of images.

It is an additional object of the present invention to increase image resolution without a corresponding decrease in detector FOV and increase in the number of detectors in the array.

It is still an additional object of the present invention to reduce the effects of the unpredictable, non-uniform illumination of detector IFOV caused by the specific scene viewed by that detector.

It is again another object of the present invention to reduce distortion as the scene viewed changes in an unpredictable way with time.

It is yet an additional object of the present invention to reduce distortion for all the detectors within an array of detectors even though each may be sensing a different non-uniformity because they are viewing different portions of a scene.

It is still a further object of the present invention to reduce errors from an error source that cannot be calibrated out in advance of, or after, detector array usage in any of the conventional ways.

It is yet another object of the present invention to reduce errors from an error source intrinsic to the scene viewed and for which no other method exists.

It is still an additional object of the present invention to improve the probability of detecting relatively small objects, fine surface features and abrupt changes in reflectance and/or emittance due to abrupt changes in ground or object composition.

It is yet another object of the present invention to reduce errors associated with rapid, moderate and slow variations in illumination non-uniformity occurring within each detector's IFOV.

It is an object of the present invention to improve the accuracy of pixel de-mixing.

These and other objects and goals of the present invention are achieved by a method of adjusting the output of an array of optical detectors to improve a derived approximation of the radiance value provided by each detector to compensate for non-uniform illumination at each detector.

DETAILED DESCRIPTION

Figure 5:
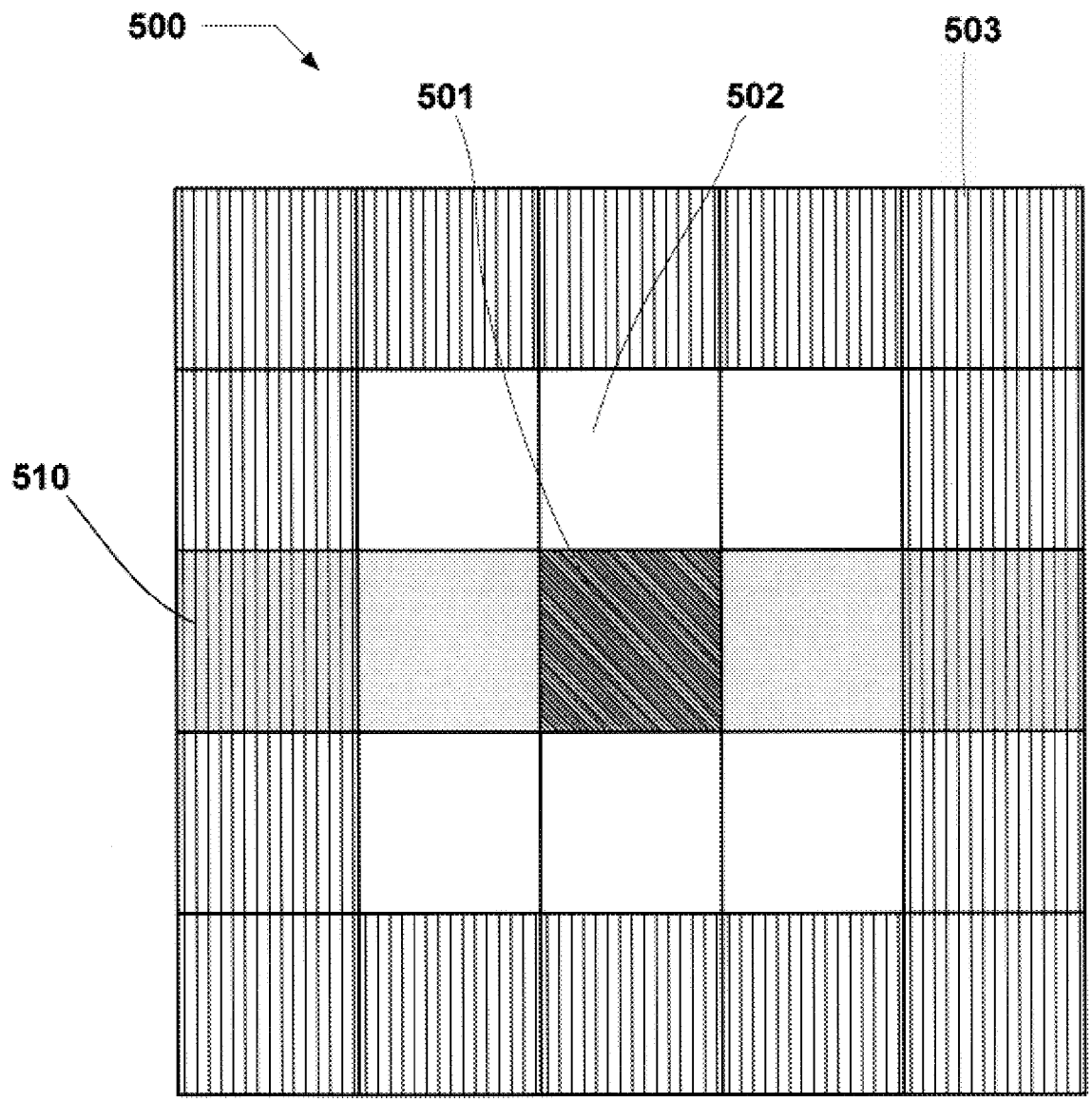
FIG. 5 depicts an array of sub-arrays selected about a single detector to be evaluated in accordance with a preferred embodiment of the present invention.

The method is based on implementing the derivative relationship between radiance, L, and irradiance, E, through its mathematical definition as a limit in a coordinate space termed the field-of-view domain. Refer to FIG. 5. For simplicity of illustration, a small planar set 500 of nested clusters 501, 502, 503 of detectors is depicted surrounding and including a selected central detector 501 of interest. An approximation of radiance, L, is associated with a sequence of clusters corresponding to the selected set 500. The set 500 is chosen to converge to the detector of interest 501 and is arranged as one set of clusters 501, 502 within at least one other set 503 of clusters, thus the term nested set of clusters. Although shown as a planar array to model actual systems, a separate linear array 510 is depicted in the planar set 500, serving to simplify later discussion of a linear set 510 of clusters for ease of explanation.

This enables emulation of the definition of radiance, L. Radiance, L, is defined by the mathematical derivative dE/dΣ (where Σ=the projected solid angle, a characteristic of the selected detector). Derivatives are defined mathematically through a limit-seeking process. It is only the limiting of the value, L, that contributes to a physical measure of radiance at a point of interest. For purposes of a preferred embodiment of the present invention, L is derived at a place in the IFOV domain (see FIG. 2, as created specifically for a preferred embodiment of the present invention) where a simulated zero-width angle value for IFOV is determined for the selected detector 501.

Figure 1:
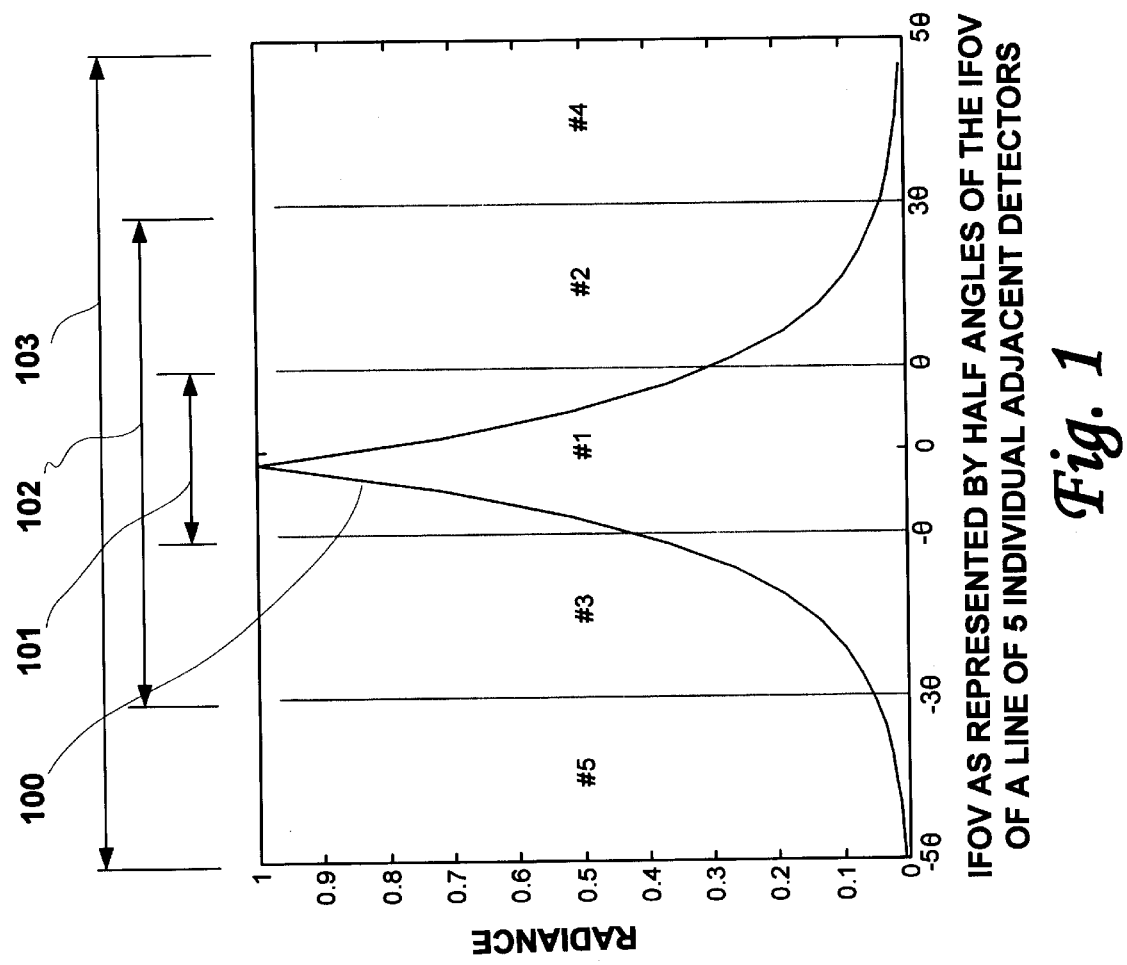
FIG. 1 is a graph depicting the averaged normalized radiance inferred from the measurements from five detectors plotted against the sum of the instantaneous view of five detectors normalized to an instantaneous field of view of one for a viewing angle of θ=0.

Refer to FIGS. 1 and 5. The IFOV of the selected (center) detector 501 (sub-array) in the linear array 510 is shown as 102 in relation to a beamwidth 100 of the illuminating radiance field centered at θ=0 on the selected detector 501. The IFOV of the immediately neighboring cluster (sub-array), i.e., the two detectors on either side of the selected detector 501 in the linear array 510 is shown as 103 and that of the far neighboring cluster (in actuality the entire linear array 510 shown, although practically only a sub-array of a larger array), also containing both the near neighboring cluster and the selected detector, is shown as 103. If the IFOVs were essentially infinitesimal in size while the nested clusters of these arrays were essentially a continuum of such detectors then we would expect the limiting process to produce exact results. Obviously in realistic situations these conditions are not met and we can expect only approximate results although it will be seen that such approximations may be quite good.

To illustrate the possible errors produced by an intrinsic-to-the-scene, thus unpredictable, non-uniform illumination of the IFOV of individual detectors, it is helpful to consider a small contiguous linear array (with beamwidths, 2θ, as shown in FIG. 1) illuminated by a pattern of reflected radiance described by $$L(\theta) = \begin{cases} L^+(\theta) = L_0 e^{\frac{-k\theta}{\vartheta}}, & \theta > 0 \\ L^-(\theta) = L_0 e^{\frac{k\theta}{\vartheta}}, & \theta < 0 \end{cases} \quad (9)$$

Here L (θ) represents the radiance seen along the line-of-sight which is at an angle θ with respect to the normal to the (linear) center of the face of the central detector of a linear, odd numbered array, where ϑ represents the half-angle of the IFOV of an individual detector in the array, $L_0$ is the peak value of the radiance and k is a constant that is adjusted to compensate for the effect of changing beamwidth (BW) of the illuminating radiance field in the calculations.

One example is the case of the narrow beam where the BW of the illuminating radiance field is less than the IFOV of a single detector, for example, BW=0.69 (IFOV) for which an appropriate value of k is 1. For a linear array of three clusters, i.e., the shaded three-cluster set as shown in FIG. 5 at 510, Table 1 lists the "actual" radiance values at the specified angles from θ=0 (as calculated from Eqn. (9)), the inferred data (as calculated from the average values from Eqn. (3) for each detector) and the percent difference between these values.

TABLE I

The actual, inferred and percent difference between normalized radiance values when k = 1 which corresponds to a BW = 0.69 (IFOV).

| Spatial Location | Actual Normalized Radiance | Inferred Normalized Radiance | Percent Difference |
|---|---|---|---|
| Center of 1st detector, 501 | 1.0 | 0.6321 | −36.8% |
| Center of immediate neighbors, 502 | 0.1353 | 0.1590 | +17.5% |
| Center of remote neighbors, 503 | 0.0183 | 0.0215 | +17.5% |

The results in Table I support the idea that when the beamwidth of the illuminating radiance field is smaller than the IFOV of the individual detectors then relatively large percent differences can be expected between the measured and interpreted values of radiance.

Similar calculations for when the BW=2.5 (IFOV), for which an appropriate value of k is 0.277, show the smaller errors that would be expected for a wider beamwidth of the illuminating radiance field. For example, the error at the center of the first detector 501, an area where the radiance is changing most rapidly, is about 12.7% while at the centers of the symmetrically located neighboring detectors 502 the error is only about 1.3%.

From a certain point of view Eqn. (1) may be regarded as a definition of radiance. It is clearly a point function, yet the measurements are made with apertures, detectors and projected-solid-angles for the IFOVs that may be small but are not infinitesimally small. The method of the present invention uses the mathematical definition of a derivative as a limit $$L(\Sigma) = \frac{dE}{d\Sigma} = \lim_{\Delta\Sigma \to 0} \frac{E(\Sigma + \Delta\Sigma) - E(\Sigma)}{\Delta E} \quad (10)$$

which can be interpreted as representing a sequence of "non-local" measurements converging to a local result at a specified azimuth angle, θ, and a specified zenith angle, Ω. The mathematics literature observes that the ratio in Eqn. (10) can usually be replaced without concern by the ratio of when that is useful to do.

$$\frac{E(\Sigma + \Delta\Sigma) - E(\Sigma - \Delta\Sigma)}{2\Delta\Sigma}$$

This procedure is illustrated for the radiance field described below for k=1 for a central detector 501 in a linearly contiguous array (outer cluster) of five identical detectors 510 as depicted at 510 in FIG. 5 and as depicted with the beamwidths of the illuminating radiance field shown in FIG. 1. The total irradiance illuminating this outer cluster 510 of five (5) detectors is:

$$E_{T_5} = E_1 + E_2 + E_3 + E_4 + E_5 = (2\theta) L_0[0.6321 + (2)0.159 + (2)0.02152], \quad (11)$$

where the symmetry of the array accounts for the doubling of 0.1590 and 0.02152, and $E_i$ (i=1, 2, 3, 4, 5) are the irradiances measured at the $i^{th}$ detector, so that $E_{T_5}=(2\theta) L_0$ (0.9941). The corresponding average radiance, normalized to $L_0$, as determined by the relation, $$\frac{E_T}{10\theta},$$

is 0.1988. See at 203 of FIG. 2 (representing the FOV domain).

In a cluster using only the inner three of the above five detectors 510, the field of view spanned by the detectors is 6θ and the total illuminating irradiance is given by $$\frac{E_{T_3}}{6\theta} = L_3 = 0.3170.$$

Figure 2:
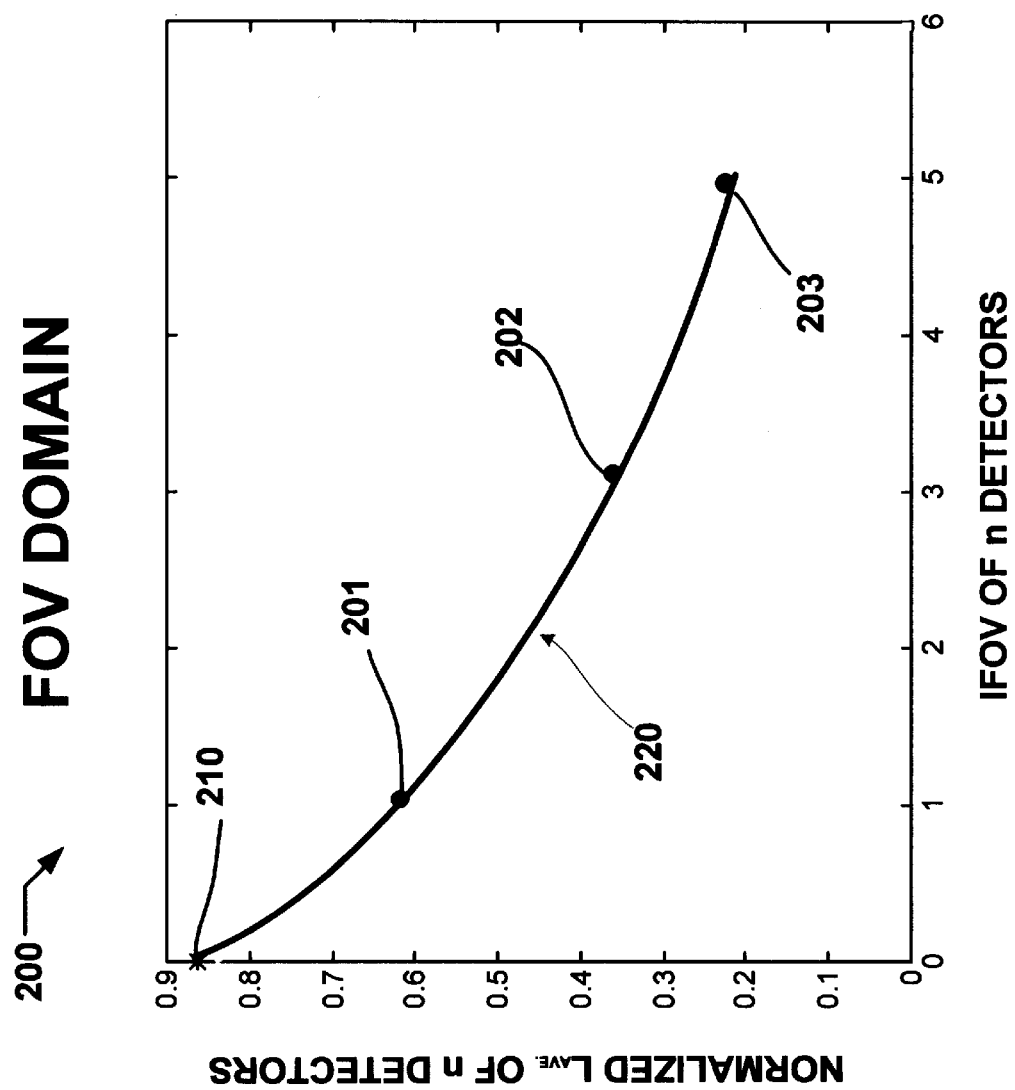
FIG. 2 is an averaged, normalized radiance provided from five detectors plotted against the sum of the instantaneous fields of view of the five detectors, divided by the instantaneous field of view of one detector for θ varying from −5θ to +5θ to derive a value for $R_0$ from the curve fit of three nested sets.

See at 202 of FIG. 2.

Refer to FIG. 2. These average normalized radiances, $L_i$, i=1, 3, 5, as above, are plotted on an X, Y plane (FOV domain 200) with coordinate, X, as $IFOV_n$, being the IFOV of each of five contiguous, linearly arrayed detectors 510 and coordinate, Y, as $L_{ave\_n}$, the total average normalized radiance contributed from each of the five detectors 510 (3 sub-arrays or data windows of 1, 3 and 5 detectors respectively) as shown by the three points plotted 201, 202, 203 in FIG. 2.

The final step in the procedure is to extrapolate the graph through those plotted points 201, 202, 203 to the limit 210 where the IFOV (of the selected (central) detector 501)=0. See FIG. 2. In mathematics, limits are obtained most often through the examination and manipulation of algebraic expressions. However, the analytic relations are unknown, thus a graphical (or equivalent) procedure must be employed. For illustrative purposes in FIG. 2, a simple curve-fit using a quadratic polynomial has been chosen. The curve represents the relationship of radiance, L, to the IFOV using only the data calculated for the three points 201, 202, 203 of the three nested clusters (i=5, 3, 1) 501, 502, 503. The fitted equation is:

$$L_n(N) = 0.864 - 0.256(N) + 0.025(N)^2, \quad (12)$$

where $$N = \frac{IFOV_n}{2\theta}$$

The result is that for N=0 (corresponding to IFOV of the selected (central) detector 501 being 0), $L_n=L_0=0.864$. This represents a more accurate approximation to the true normalized radiance value of 1.000 at θ=0 than the measured (inferred from measuring irradiance) normalized radiance of 0.632. It is of particular note that this example is directed to a one-dimensional array 510 of detectors, i.e., a single line, thus, the geometric center is a line, not a point. Thus, the solution is simplified compared to that of a planar array 500 of detectors, i.e., detectors aligned to a selected (central) detector 501 in two dimensions, instead of simply side by side.

The preceding procedure is appropriate for peaks, valleys and stretches of monotonically increasing or decreasing radiance data. When a segment is "almost" monotonic, i.e., a peak or valley lies near the end of a segment, some adjustment, such as a split-field decomposition (when the last detector in a sequence for a monotonically increasing or decreasing set of measurements is viewing the peak of the curve within the IFOV), is required. For the above example, this is illustrated by considering the data point (inferred from irradiance measurements) L=0.1590 at θ=−2θ located at the center of detector number three (FIG. 1). To calculate a limit radiance at −2θ using a preferred embodiment of the present invention, only one side of the "curve" of FIG. 1 for the three clusters 501, 502, 503 used in the above example will be used, i.e., those represented by detectors numbered one, three and five. However, the full irradiance from detector number one cannot be used because the downturn in radiance illumination just past the peak at θ=−5θ to θ=0 is not "relevant" to the monotonically increasing curve just before the peak. Only the half on the side of the curve of interest (viewer's left side for the curve of FIG. 1) can be used. Thus only the measured irradiances within the IFOV from θ=−5θ to θ=0 will be used.

Thus, the sum from the three detectors will be $$E_{T_3} = E_5 + E_3 + \frac{E_1}{2} = (2\theta)L_0\left[0.0215 + 0.1590 + \frac{0.6321}{2}\right] \quad (13)$$

From this averaged, normalized radiance in IFOV=5θ is calculated as $$L_{av3}=0.1986 \quad (14)$$

Figure 3:
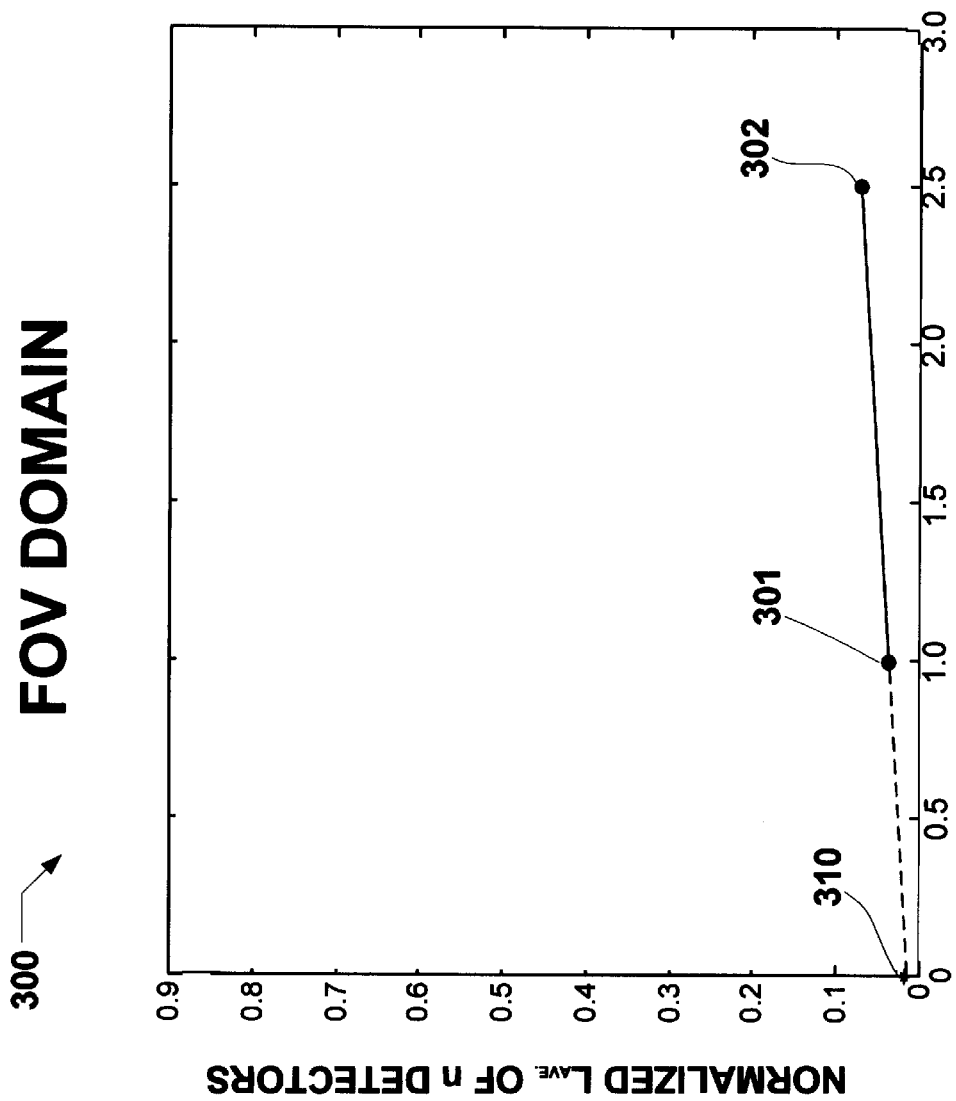
FIG. 3 depicts the use of curve-fitting to derive the response at θ=0 for a central detector, while using only one side of the IFOV response of five detectors of a linear array.

Eqn.(14) along with $L_{av1}$=0.1590 is shown in FIG. 3, for IFOV values at N=2.5 302 and 1.0 301, respectively. Using the two points, a line is fitted having the relation:

$$L_n(N)=0.1326+0.0264 \, (N), \quad (15)$$

where $$N = \frac{IFOV_n}{2\theta}$$

As can be seen both from Eqn. (15) and in the FOV Domain 300 of the line interpolated to N=0 in FIG. 3, $L_5$ (0) 310=0.13264. This provides an error of 2% as compared to 17.5% using the averaged values of existing methods since the actual value is 0.135335. Table II compares actual values, values obtained based on a preferred embodiment of the present invention, and values obtained using a conventional averaging method (inferred from measurements of irradiance).

TABLE II

The actual, measured, corrected and percent difference between actual and corrected normalized radiance values when k = 1.

| Spatial Location | Actual Radiance | Inferred Radiance | Corrected Radiance | Percent Difference |
|---|---|---|---|---|
| Center of selected detector | 1.0 | 0.6321 | 0.8638 | 13.6% |
| Center of neighboring detectors | 0.1353 | 0.1590 | 0.1326 | 2.0% |

It can be seen by comparing Tables I and II that the correction of the peak value by a preferred embodiment of the present invention has reduced error from 36.8 percent to 13.6 percent while the error from the contributions at the centers of the detectors neighboring the central detector have been reduced from 17.5 percent to 2.0 percent.

There are a number of measures of spatial resolution in current use. See, for example, Tables 12-2 and 12-3 of Holst, ibid. The increased accuracy shown in the preceding results may be related to improvements in spatial resolution. Specifically, for a given beamwidth of the illuminating radiance field, the IFOV must be made smaller if the conventional method of inference of radiance from the measurement of irradiance averaged over the detector's non-infinitesimally small solid angle is to produce the same accuracy as a preferred embodiment of the present invention. As an example, for the radiance described by Eqn. (9) and k=1, the decrease in IFOV size needed to have the original measured radiance value of 0.632 (normalized) be measured as 0.864 can be calculated. In evaluating the average value of L(θ), a new angular width of integration of 2aθ is used (where a <1), so that a value of "a" that yields 0.864 is calculated. The necessary value of a is 0.300. Thus, θ has been reduced by 70% in IFOV (and equivalent pixel size). Of course, the practical limitation of this is that, for equivalent coverage, an array of sensors would contain many more detectors, each with much smaller IFOVs. This would also necessitate processing much more raw data. This reduction in error (a factor of about ½₁) is far greater than that for the peak (a factor of about ⅓), but because the radiance is dropping or rising more slowly here than at the peak a larger reduction in error should be expected.

EXAMPLE

Figure 4:
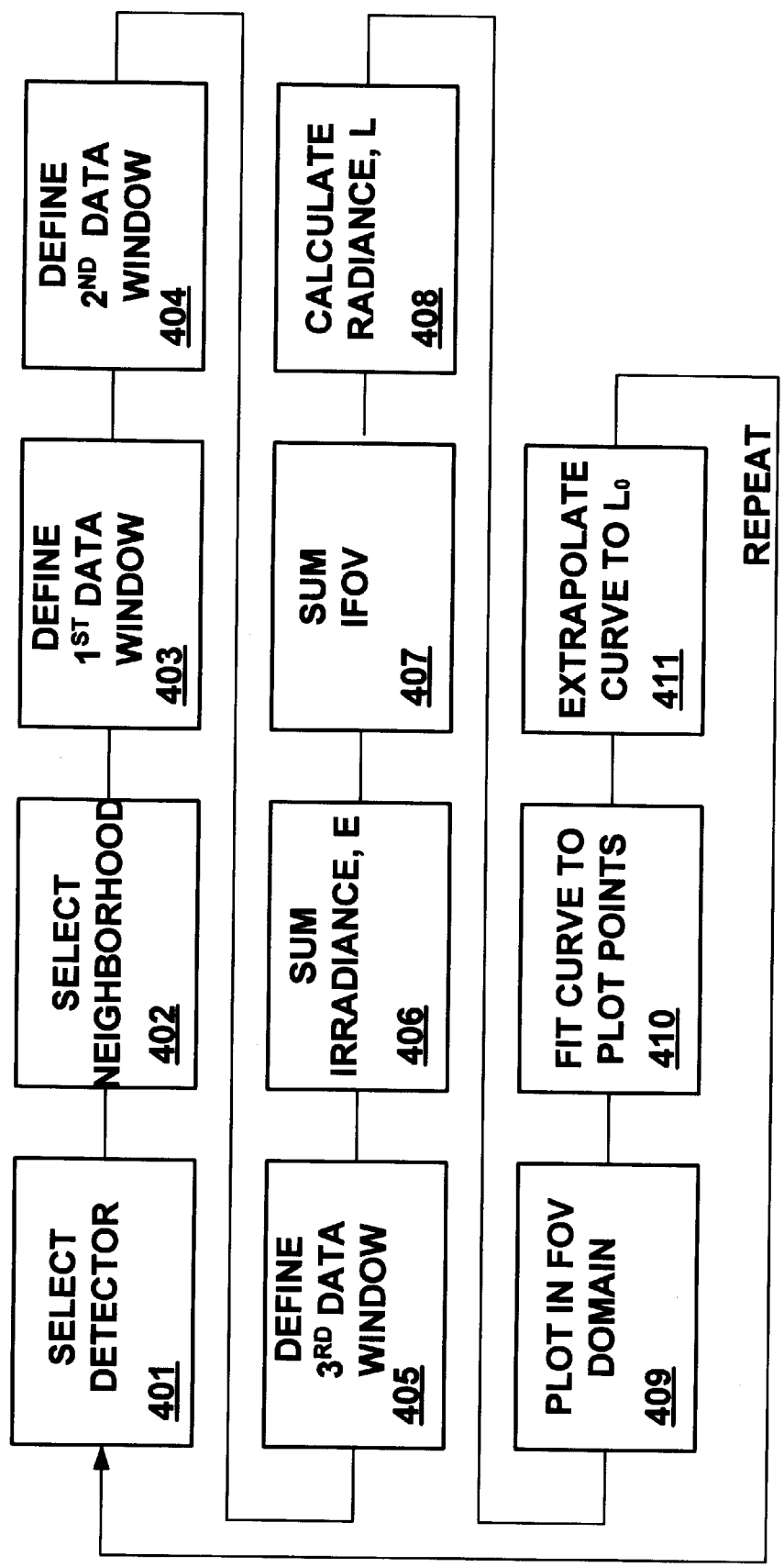
FIG. 4 is a flow chart detailing a specific example of a method used in a preferred embodiment of the present invention.

Refer to FIG. 4. A flow diagram indicating steps of the process of a preferred embodiment of the present invention is shown for a nested cluster that has three clusters in addition to the selected detector "nested" within a selected "neighborhood." At step 401 a particular detector within an array is selected. Usually this selection is part of a standard scanning process known to one skilled in the art. Pursuing the following steps once yields a precise estimate of the radiance caused by unpredictable, non-uniform illumination across the effective area of the selected detector only.

At step 402, the size of a "neighborhood of detectors" (sub-array) surrounding the selected detector is established. This neighborhood constitutes the largest "data window," i.e., one that includes each of the smaller nested data windows to be used, including the selected detector, upon which it is centered. For example, in FIG. 5, the nested set of the planar array 500 is that consisting of the selected detector 501 (the smallest data window), the immediately surrounding neighboring set 502 (the next smallest data window), and the far neighboring set 503, which is the largest data window for that "neighborhood of detectors."

At step 403 the outer or largest data window constituting the neighborhood is set. Generally, this data window will be a square constituting the number of detectors established in the neighborhood of step 402, such as a 7×7 array (for a square matrix of detectors in a sensor system). Note that this example uses one more nested array (sub-array) than that shown in FIG. 5.

At step 404 the next smaller sub-array of detectors (nested data window) within the selected neighborhood is set. For the example of the 7×7 array, the next sub-array is a 5×5 array as is shown as the largest nested set (data window) 503 in FIG. 5 but is the next to the largest sub-array of this example.

At step 405, the largest sub-array able to nest within the sub-array selected in step 404 is set in the same manner as those at steps 404 and 403. In the example of a 7×7 neighborhood this is a 3×array. Using symmetric arrays, the only "array" left in this example of a 7×7 neighborhood would be the selected detector itself, already selected in step 401.

At step 406, irradiance, E, as measured by the detectors is summed for each data window defined in steps 401 and 403–405.

At step 407, based upon the characteristics of the individual detectors and the number of detectors in each data window, the IFOVs for each of these data windows are summed.

At step 408, a rough estimate of the radiance, L, is established by dividing the irradiance, E, of each "data window" (each nested sub-array, all of which include the whole neighborhood and the selected detector) by its corresponding IFOV. For the example of a 7×7 "largest data window," this would include dividing each of: the 7×7 sub-array, the included 5×5 sub-array, the included 3×3 sub-array, and the selected detector itself. If the imaging sensor has only a 7×7 array of detectors, of course, the 7×7 array would not be a "sub-array" in the strict sense.

At step 409, the radiance values, L, are plotted in a "field of view domain" versus the IFOV values for each of the data windows, e.g., in the case of a 7×7 sub-array (neighborhood), this is a plot for IFOVs of sub-arrays comprising 1, 3, 5, and 7 detectors, respectively.

At step 410 a smooth, continuous curve, generally defined by a polynomial, is fit though the plotted points. See, for example, the curve 220 of FIG. 2., fitted for a 5×5 sub-array (neighborhood).

At step 411, the curve is extrapolated to the radiance value corresponding to an IFOV of zero, i.e., $L_0$. This value is that inferred with a zero-width IFOV detector located at a geometric point within the selected detector's IFOV. The above steps are repeated for each detector of interest in a sensor's array of detectors.

This example may be further simplified by normalizing. If one considers the process is the operational equivalent of determining radiance, L, from the limit definition of the derivative $L=dE/d\Sigma=(1/K)dE/dI$, where $\Sigma=KI$, then it may be normalized by dividing by K, a constant established for a particular sensor's optical system. $\Sigma$ is a projected solid angle, i.e., a solid angle multiplied by the cosine of the angle through which the detector in a sensor views a scene (the angle being that between the selected detector's view direction and a theoretical line perpendicular to the planar sensor array of which the detector is a part). Thus, the normalized radiance is equal to the estimated radiance divided by the factor K.

Once the normalized radiance has been calculated, the same process may be applied to each detector of interest in the array. The result is a set of normalized numerical values for radiance that forms the image being viewed by the sensor (array of detectors).

Although a number of embodiments of the present invention have been presented by way of example, the present invention should not be limited thereby. Rather, the present invention should be construed to include any and all variations, adaptations, modifications, embodiments, and permutations that would occur to one skilled in this art who has been taught the present invention by this application. For example, any physical or mathematical technique that accomplishes substantially the same function as the derivative-as-limit algorithm, including variation s of the least squares method, should be considered to fall within the scope of the present invention. Consequently, the present invention should be interpreted as being limited only by the following claims.

What is claimed is:

1. A method of processing measurement data having errors due to unpredictable non-uniformity in illumination of a detector from a scene viewed by an array of detectors in a sensor, said method providing an accurate estimate of radiance at a geometric point in the instantaneous field of view (IFOV) of said detectors, comprising:

a. selecting a first one of said detectors across whose IFOV an accurate estimate of actual illumination is desired;

b. selecting a group of said detectors surrounding said first one of said detectors, said group designated as a largest sub-array representing a largest data window of detectors, said group established about said first one of said detectors as the center of said group;

c. constructing a nested set representing a unique group of sub-arrays of said detectors, each said sub-array designated as a unique data window, in said nested set, wherein each said sub-array fits within said largest sub-array, said sub-arrays decreasing in size such that each smaller said sub-array fits within an immediately preceding said sub-array and encompasses an immediately succeeding said sub-array until said first selected detector is the last said sub-array in said nested set;

d. summing the irradiances, E, measured for each said data window to yield a value of E for each said data window;

e. summing said IFOV for each said detector in each said data window to yield associated values of IFOV for each said data window;

f. calculating associated preliminary estimates of radiance, L, from the relationship, L=E/associated IFOV;

g. establishing a relationship between said radiance values, L, versus corresponding said associated IFOV values in a FOV domain, wherein said FOV domain is defined as a two-dimensional graph of IFOV versus L on which a smooth continuous curve may be fit to points plotted to represent said relationship;

h. extrapolating to obtain a value for radiance, L, at a zero-width IFOV, wherein said extrapolating yields said accurate estimate for radiance at said zero-width IFOV located at a geometric point within said WFOV of said first selected detector; and i. repeating steps a–h for all said detectors of interest in said array, wherein completion of steps a–i yields a set of numerical values for derived radiance from each said detector of interest in said array, and wherein said derived radiance values enable formation of an image with greater accuracy in said radiance values, increased contrast, some spatial de-blurring, and better resolution as compared to processing images without following said steps a–i.

2. The method of claim 1 further comprising normalizing said values of derived radiance by dividing each said value by a factor, K, a constant established for a particular sensor's optical system.

\* \* \* \* \*